US012768284B2

(12) United States Patent
Mangardich et al.

(10) Patent No.: US 12,768,284 B2
(45) Date of Patent: Oct. 20, 2026

(54) ROTOR CRACK DETECTION AND MITIGATION

(71) Applicant: Pratt & Whitney Canada Corp., Québec (CA)

(72) Inventors: Dikran Mangardich, Richmond Hill (CA); Jason Herborth, Acton (CA); Tom McDonough, Barrie (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 5 days.

(21) Appl. No.: 18/968,717

(22) Filed: Dec. 4, 2024

(65) Prior Publication Data

US 2026/0153042 A1 Jun. 4, 2026

(51) Int. Cl.
*F01D 21/06* (2006.01)
*B64D 27/10* (2006.01)
(Continued)

(52) U.S. Cl.
CPC ........... *F01D 21/003* (2013.01); *B64D 27/10* (2013.01); *B64D 45/00* (2013.01); *F01D 11/001* (2013.01);
(Continued)

(58) Field of Classification Search
CPC ...... F01D 21/003; F01D 11/001; F01D 21/06; F05D 2260/80; F05D 2270/09;
(Continued)

(56) References Cited

U.S. PATENT DOCUMENTS 4,498,291 A * 2/1985 Jeffery .................. F01D 21/045 60/39.091
4,503,667 A * 3/1985 Roberts ................. F01D 21/045 60/39.091
(Continued)

FOREIGN PATENT DOCUMENTS

JP 2006138259 A 6/2006
JP 2022094714 A 6/2022

OTHER PUBLICATIONS

Search Report issued in European Patent Application No. 25219478.2; Date of Mailing May 29, 2026 (7 pages).

*Primary Examiner* — Nathaniel E Wiehe
*Assistant Examiner* — Theodore C Ribadeneyra
(74) *Attorney, Agent, or Firm* — CANTOR COLBURN LLP

(57) ABSTRACT

Gas turbine engines include a rotating component having a disc and defining an axis therethrough. A static component is arranged axially adjacent to the rotating component and includes a primary rub flange that extends axially from the disc of the rotating component toward the static component. The static component includes an interfacing rub flange extending axially from the static component toward the rotating component and is arranged radially adjacent to the primary rub flange. The primary rub flange includes a primary rubbing surface and the interfacing rub flange includes an interfacing rubbing surface with the primary rubbing surface spaced from the interfacing rubbing surface by a separation gap. The primary rub flange is configured to
(Continued)

deflect in the presence of a crack in the disc to close the separation gap such that the primary rubbing surface contacts the interfacing rubbing surface.

17 Claims, 8 Drawing Sheets

(51) Int. Cl.

| | |
|---|---|
| ***B64D 45/00*** | (2006.01) |
| ***F01D 11/00*** | (2006.01) |
| ***F01D 21/00*** | (2006.01) |
| ***G01M 15/14*** | (2006.01) |

(52) U.S. Cl.
CPC ............. *F01D 21/06* (2013.01); *G01M 15/14* (2013.01); *B64D 2045/0085* (2013.01); *F05D 2260/80* (2013.01); *F05D 2270/09* (2013.01)

(58) Field of Classification Search
CPC .................... B64D 27/10; B64D 45/00; B64D 2045/0085; G01M 15/14
See application file for complete search history.

(56) References Cited

U.S. PATENT DOCUMENTS

| | | | | |
|---|---|---|---|---|
| 4,505,104 | A * | 3/1985 | Simmons | F01D 21/045 60/39.091 |
| 7,540,709 | B1 * | 6/2009 | Ebert | F04D 29/083 415/173.7 |
| 8,388,310 | B1 * | 3/2013 | Diakunchak | F01D 11/001 415/173.7 |
| 9,017,013 | B2 * | 4/2015 | Laurello | F01D 11/001 415/115 |
| 9,309,783 | B2 * | 4/2016 | Nallam | F01D 11/02 |
| 10,544,699 | B2 | 1/2020 | Clayton | |
| 11,668,203 | B2 * | 6/2023 | Gemme | F01D 11/001 415/171.1 |
| 2009/0301055 | A1 | 12/2009 | Kallappa | |
| 2012/0163955 | A1 * | 6/2012 | Devi | F01D 11/02 415/173.1 |
| 2020/0173297 | A1 * | 6/2020 | Merry | F01D 11/08 |
| 2022/0403753 | A1 | 12/2022 | Kumar et al. | |

* cited by examiner

ROTOR CRACK DETECTION AND MITIGATION

BACKGROUND

Illustrative embodiments pertain to the art of turbomachinery, and specifically to turbine rotor components.

Gas turbine engines are rotary-type combustion turbine engines built around a power core made up of a compressor, combustor and turbine, arranged in flow series with an upstream inlet and downstream exhaust. The compressor compresses air from the inlet, which is mixed with fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

The individual compressor and turbine sections in each spool are subdivided into a number of stages, which are formed of alternating rows of rotor blade and stator vane airfoils. The airfoils are shaped to turn, accelerate, and compress the working fluid flow, or to generate lift for conversion to rotational energy in the turbine.

The compressor section and the turbine section each have airfoils including rotating blades and stationary vanes. The rotating compressor parts (e.g., bladed or integrally bladed discs), are continually being redesigned to save on weight, resulting in thin and/or more flexible rotor designs. The thin rotor designs may be prone to a greater risk of fatigue cracking due to the extreme operating conditions of the aircraft engine. The detrimental effects of high-cycle-fatigue are pronounced with thinner and/or more flexible rotor designs as compared to conventional systems and configurations. Combined with the severe environmental conditions of high temperature, foreign object damage (FOD), or inherent flaws associated to the material alloy or manufacturing and forging processes, light weight and flexible rotor designs have a higher risk for developing and propagating fatigue cracks.

Although high-cycle fatigue (HCF) on blades is not considered to be hazardous, release of blades subject to HCF occurs with some regularity. However, because the rotors are being designed to be thinner and more flexible, a greater risk of HCF is present, not only on the blade itself, but on the rotor disc as well. Such HCF can result in propagation of cracks from the blades into the rotor disc. For example, unforeseen circumstances can lead to rotor cracking such as higher than expected vibratory stresses, service damage, or inherent flaws through the forging or manufacturing processes. Accordingly, HCF may be present in not only the blades but also the rotor discs. Mechanisms for monitoring and/or addressing such events, such as crack formation, may provide for improved engine reliability and/or reductions in maintenance and/or damage due to crack formation.

BRIEF DESCRIPTION

Disclosed is a gas turbine engine including: a rotating component comprising a disc and defining an axis therethrough; and a static component arranged axially adjacent to the rotating component, wherein the rotating component comprises a primary rub flange that extends axially from the disc of the rotating component toward the static component, wherein the static component comprises an interfacing rub flange extending axially from the static component toward the rotating component, the interfacing rub flange arranged radially adjacent to the primary rub flange, wherein the primary rub flange comprises a primary rubbing surface and the interfacing rub flange includes an interfacing rubbing surface, and the primary rubbing surface is spaced from the interfacing rubbing surface by a separation gap, and wherein the primary rub flange is configured to deflect in the presence of a crack in the disc to close the separation gap such that the primary rubbing surface contacts the interfacing rubbing surface.

In addition to one or more of the features described above, or as an alternative to any of the foregoing embodiments, the primary rub flange is formed of a same material as the disc.

In addition to one or more of the features described above, or as an alternative to any of the foregoing embodiments, each of the primary rub flange and the interfacing rub flange are made of metal.

In addition to one or more of the features described above, or as an alternative to any of the foregoing embodiments, the primary rub flange is formed of a first metal and the interfacing rub flange is formed of a second metal that is different from the first metal.

In addition to one or more of the features described above, or as an alternative to any of the foregoing embodiments, the primary rub flange has a thickness $t_r$ in a radial direction and the interfacing rub flange has a thickness $t_s$ in a radial direction, and wherein: 0.5<<1.5.

$$0.5 \leq \frac{t_r}{t_s} \leq 1.5.$$

In addition to one or more of the features described above, or as an alternative to any of the foregoing embodiments, the primary rub flange has a thickness $t_r$ in a radial direction, the interfacing rub flange has a thickness $t_s$ in a radial direction, and the primary rubbing surface and the interfacing rubbing surface define an axial length of overlap $L_i$, and wherein $L_i \geq t_r + t_s$.

In addition to one or more of the features described above, or as an alternative to any of the foregoing embodiments, the separation gap has a gap distance $G_i$, without the presence of a crack, and the gap distance $G_i$ is defined as: $G_i \geq \Delta CF + \Delta Thermal + \Delta Gyroscopic + \Delta Tolerance$.

In addition to one or more of the features described above, or as an alternative to any of the foregoing embodiments, the primary rub flange includes an undercut between the disc and the primary rubbing surface.

In addition to one or more of the features described above, or as an alternative to any of the foregoing embodiments, the undercut defines a portion of the primary rub flange having a smaller radial thickness than a portion of the primary rub flange that defines the primary rubbing surface.

In addition to one or more of the features described above, or as an alternative to any of the foregoing embodiments, the undercut has a radial thickness $t_{ur}$ and the portion of the primary rub flange that defines the primary rubbing surface has a radial thickness $t_r$, and wherein $$0.5 \leq \frac{t_{ur}}{t_r} \leq 0.9.$$

In addition to one or more of the features described above, or as an alternative to any of the foregoing embodiments, the rotating component is an integrally bladed rotor disc comprising a plurality of rotor blades that are integrally formed with the disc.

In addition to one or more of the features described above, or as an alternative to any of the foregoing embodiments, the primary rub flange defines a continuous, annular extension from the rotating component.

In addition to one or more of the features described above, or as an alternative to any of the foregoing embodiments, the primary rub flange defines a discontinuous set of tabs arranged circumferentially about and extending from the rotating component.

In addition to one or more of the features described above, or as an alternative to any of the foregoing embodiments, the disc comprises a plurality of blades extending radially outward from the disc, and the primary rub flange includes one tab of the set of tabs for each blade of the plurality of blades.

In addition to one or more of the features described above, or as an alternative to any of the foregoing embodiments, the disc comprises a plurality of blades extending radially outward from the disc, and the primary rub flange includes two tabs of the set of tabs for each blade of the plurality of blades.

In addition to one or more of the features described above, or as an alternative to any of the foregoing embodiments, the primary rub flange comprises a set or discrete rubbing elements extending about the circumference of the primary rub flange.

In addition to one or more of the features described above, or as an alternative to any of the foregoing embodiments, a controller is configured to monitor operation of the gas turbine engine for indication of crack formation, wherein the indication of crack formation is at least one of vibration signatures, engine surge signatures, and/or noise signatures that are indicative of a crack due to rubbing between the primary rub flange and the interfacing rub flange.

Also disclosed is a method of monitoring a gas turbine engine for crack formation in a rotating component, the gas turbine engine including the rotating component that includes a disc and defines an axis therethrough and a static component arranged axially adjacent to the rotating component, wherein the rotating component comprises a primary rub flange that extends axially from the disc of the rotating component toward the static component, the static component comprises an interfacing rub flange extending axially from the static component toward the rotating component, the interfacing rub flange arranged radially adjacent to the primary rub flange, the primary rub flange comprises a primary rubbing surface and the interfacing rub flange comprises an interfacing rubbing surface, and the primary rubbing surface is spaced from the interfacing rubbing surface by a separation gap, and the primary rub flange is configured to deflect in the presence of a crack in the disc to close the separation gap such that the primary rubbing surface contacts the interfacing rubbing surface, the method including: arranging the rotating component relative to the static component with the separation gap defined between the primary rub flange and the interfacing rub flange; and during operation of the gas turbine engine, monitoring operation of the gas turbine engine for indication of crack formation, wherein the indication of crack formation is at least one of vibration signatures, engine surge signatures, and/or noise signatures that are indicative of a crack due to rubbing between the primary rub flange and the interfacing rub flange.

In addition to one or more of the features described above, or as an alternative to any of the foregoing embodiments, further including performing an engine shutdown operation in response to detection of crack formation.

In addition to one or more of the features described above, or as an alternative to any of the foregoing embodiments, further including generating at least one of an alert or a notification in response to detection of crack formation.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be illustrative and explanatory in nature and non-limiting.

BRIEF DESCRIPTION OF THE DRAWINGS

The following descriptions should not be considered limiting in any way. With reference to the accompanying drawings, like elements are numbered alike: The subject matter is particularly pointed out and distinctly claimed at the conclusion of the specification. The foregoing and other features, and advantages of the present disclosure are apparent from the following detailed description taken in conjunction with the accompanying drawings in which like elements may be numbered alike and:

DETAILED DESCRIPTION

Detailed descriptions of one or more embodiments of the disclosed apparatus and/or methods are presented herein by way of exemplification and not limitation with reference to the Figures.

Figure 1:
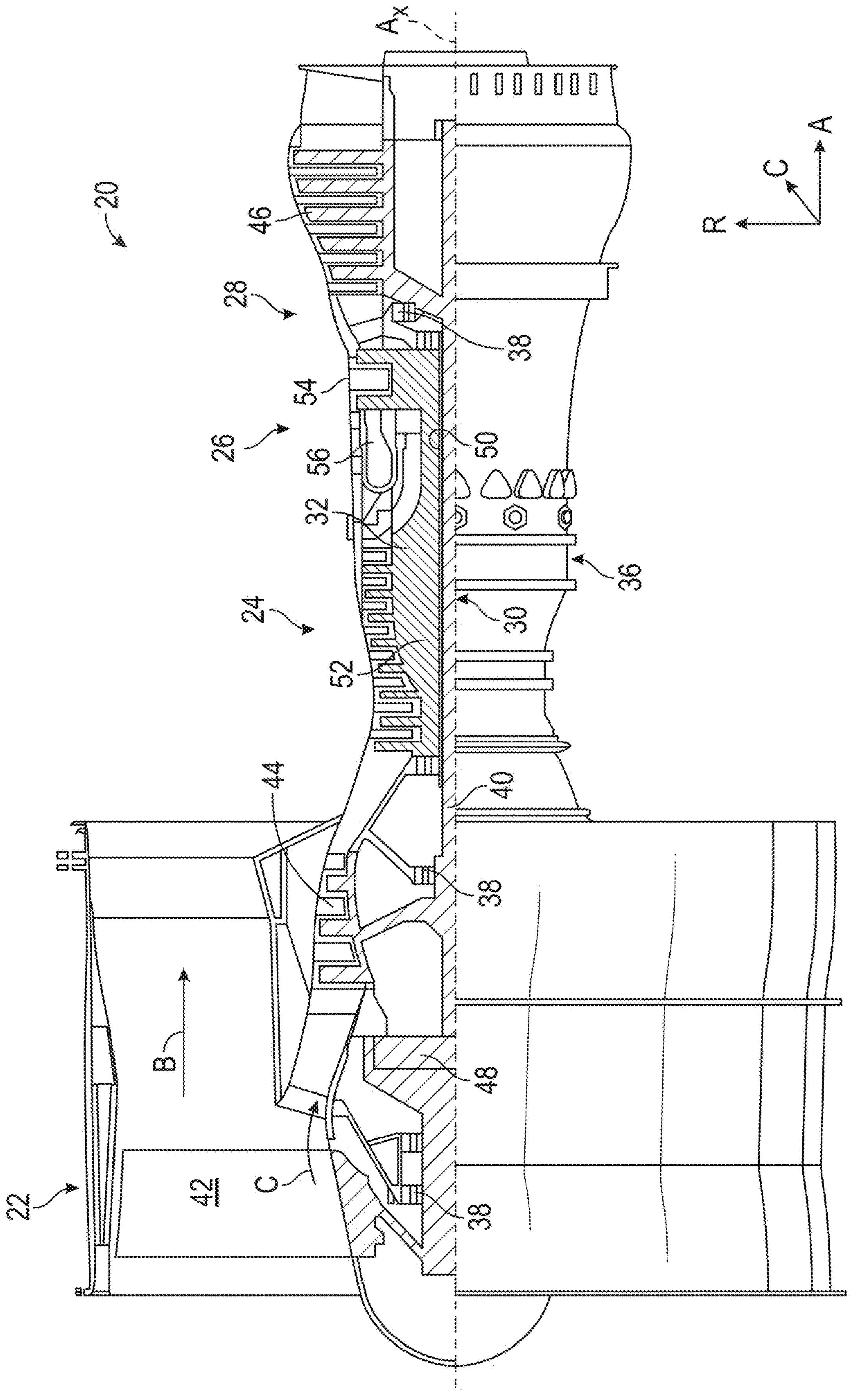
FIG. 1 is a schematic cross-sectional illustration of a gas turbine engine that may incorporate embodiments of the present disclosure.

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct, while the compressor section 24 drives air along a core flow path C for compression and communication into the combustor section 26 then expansion through the turbine section 28. With reference to FIG. 1, as used herein, "aft" refers to the direction associated with the tail (e.g., the back end) of an aircraft, or generally, to the direction of exhaust of the gas turbine engine (to the right in FIG. 1). The term "forward" refers to the direction associated with the nose (e.g., the front end) of an aircraft, or generally, to the direction of flight or motion (to the left in FIG. 1). An axial direction A is along an engine central longitudinal axis $A_x$ (left and right on FIG. 1). Further, radially inward refers to a negative radial direction relative to the engine axis $A_x$ and radially outward refers to a positive radial direction (radial being up and down in the cross-section of the page of FIG. 1). A circumferential direction C is a direction relative to the engine axis $A_x$ (e.g., a direction of rotation of components of the engine; in FIG. 1, circumferential is a direction into and out of the page, when offset from the engine axis $A_x$). An A-R-C axis is shown in the drawings to illustrate the relative position of various components.

The gas turbine engine 20, as shown, includes a low speed spool 30 and a high speed spool 32 mounted for rotation about the engine central longitudinal axis $A_x$ relative to an engine static structure 36 via several bearing systems 38. It should be understood that various bearing systems 38, arranged at various locations may alternatively or additionally be provided, and the location of the bearing systems 38 may be varied as appropriate to the application and/or engine configuration.

The low speed spool 30 generally includes an inner shaft 40 that interconnects a fan 42, a low pressure compressor 44 and a low pressure turbine 46. The inner shaft 40 is connected to the fan 42 through a speed change mechanism, which in the gas turbine engine 20 is illustrated as a geared architecture or gear system 48 configured to drive the fan 42 at a lower speed than the low speed spool 30. The high speed spool 32 includes an outer shaft 50 that interconnects a high pressure compressor 52 and high pressure turbine 54. A combustor 56 is arranged between the high pressure compressor 52 and the high pressure turbine 54. An engine static structure 36 is arranged between the high pressure turbine 54 and the low pressure turbine 46. The engine static structure 36 is configured to support the bearing systems 38. The inner shaft 40 and the outer shaft 50 are concentric and rotate via bearing systems 38 about the engine central longitudinal axis $A_x$ which is collinear with their longitudinal axes.

The core airflow is compressed by the low pressure compressor 44 then the high pressure compressor 52, mixed and burned with fuel in the combustor 56, then expanded over the high pressure turbine 54 and the low pressure turbine 46. The turbines 46, 54 rotationally drive the respective low speed spool 30 and high speed spool 32 in response to the expansion. It will be appreciated that each of the positions of the fan section 22, compressor section 24, combustor section 26, turbine section 28, and gear system 48 may be arranged in a different configuration or arrangement than that shown in FIG. 1. For example, the gear system 48 may be located aft of the combustor section 26 or even aft of the turbine section 28, and/or the fan section 22 may be positioned forward or aft of the location of the gear system 48.

The engine 20 in one non-limiting example is a high-bypass geared aircraft engine. In some such configurations and examples, the engine 20 may be configured with a bypass ratio that is greater than about six (6), with an example embodiment being greater than about ten (10). Further, the geared architecture 48 may be configured as an epicyclic gear train, such as a planetary gear system or other gear system, with a gear reduction ratio of greater than about 2.3. Such systems may include that the low pressure turbine 46 has a pressure ratio that is greater than about five (5). In one non-limiting embodiment, the engine 20 may have a bypass ratio that is greater than about ten (10:1), a fan diameter that is significantly larger than that of the low pressure compressor 44, and the low pressure turbine 46 has a pressure ratio that is greater than about five (5:1). The low pressure turbine 46 pressure ratio is pressure measured prior to inlet of low pressure turbine 46 as related to the pressure at the outlet of the low pressure turbine 46 prior to an exhaust nozzle.

The geared architecture 48 may be an epicycle gear train, such as a planetary gear system or other gear system, with a gear reduction ratio of greater than about 2.3:1. It should be understood, however, that the above parameters are only exemplary of one embodiment of a geared architecture engine and that the present disclosure is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,688 meters). The flight condition of 0.8 Mach and 35,000 ft (10,688 meters), with the engine at its best fuel consumption—also known as "bucket cruise Thrust Specific Fuel Consumption ('TSFC')"—is the industry standard parameter of lbm of fuel being burned divided by lbf of thrust the engine produces at that minimum point. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45. "Low corrected fan tip speed" is the actual fan tip speed in ft/see divided by an industry standard temperature correction of $[(\text{Tram }^\circ \text{ R})/(518.7^\circ \text{ R})]^{0.5}$. The "Low corrected fan tip speed" as disclosed herein according to one non-limiting embodiment is less than about 1150 ft/second (350.5 m/sec).

Although the gas turbine engine 20 is depicted as a turbofan, it should be understood that the concepts described herein are not limited to use with the specifically described and illustrated configuration. Rather, the teachings herein may be applied to other types of engines such as, but not limited to, turbojets, turboshafts, etc.

Figure 2:
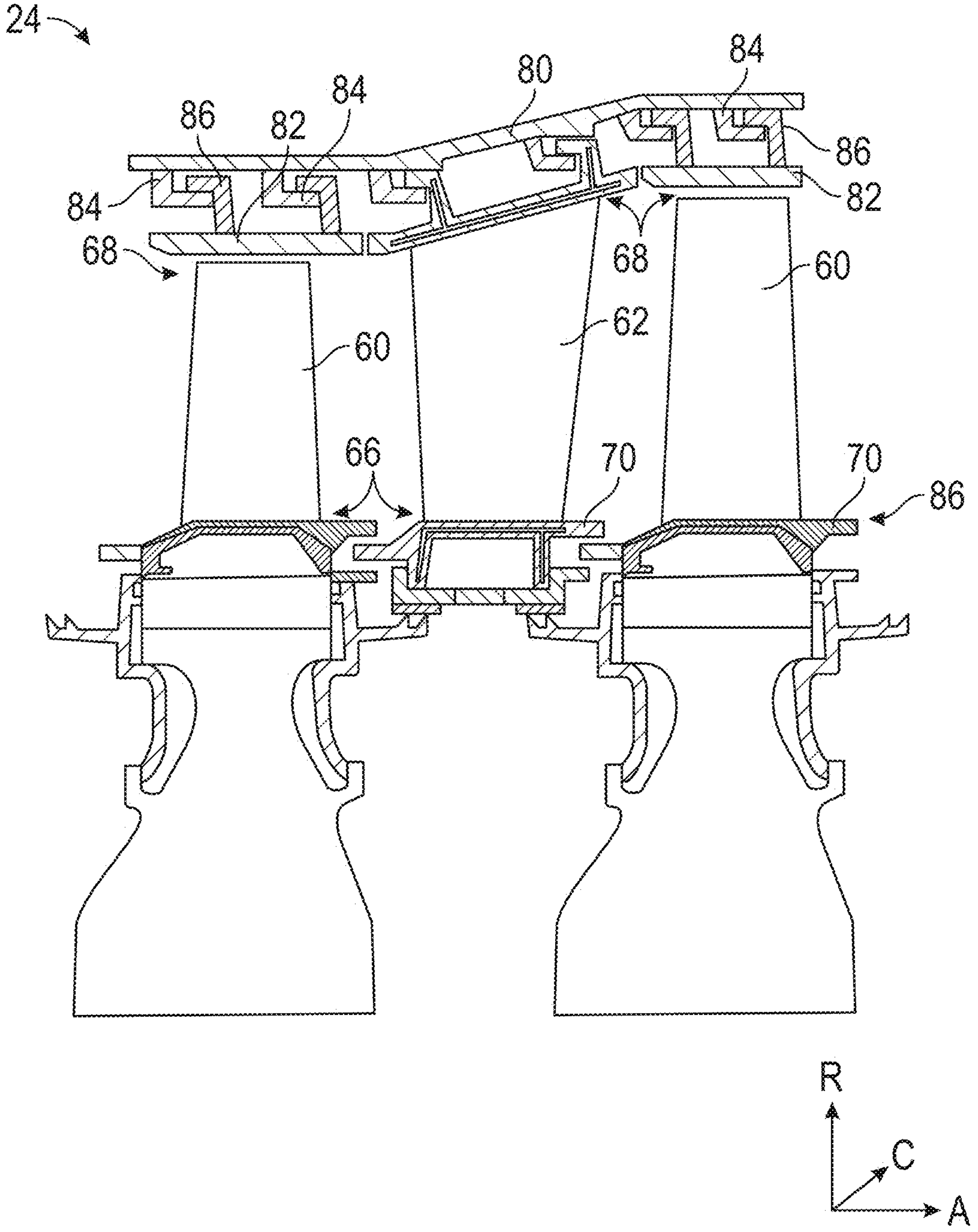
FIG. 2 is a schematic illustration of a portion of a rotating component section of the gas turbine engine of FIG. 1 that may incorporate embodiments of the present disclosure.

FIG. 2 is a schematic view of a portion of a rotating component section (indicated as compressor section 24) that may employ various embodiments disclosed herein. It will be appreciated that the illustrative rotating component section of FIG. 2 may be representative of a compressor section, a turbine section, or the like. The compressor section 24 includes a plurality of airfoils 60, 62 including, for example, one or more blades 60 and vanes 62. The airfoils 60, 62 may be hollow bodies with internal cavities or cooling passages defining a number of channels, hereinafter airfoil cooling passages, formed therein and extending from an inner diameter 66 to an outer diameter 68 of the respective airfoils 60, 62, or vice-versa. The airfoil cooling passages may be separated by partitions within the airfoils 60, 62 that may extend either from the inner diameter 66 or the outer diameter 68 of the respective airfoil 60, 62. In some embodiments, the partitions may extend the entire length of the component. In some embodiments, the partitions may extend for a portion of the length of the airfoil 60, 62, but may stop or end prior to forming a complete wall within the airfoil 60, 62. Thus, each of the airfoil cooling passages may be fluidly connected and form a fluid path within the respective airfoil 60, 62. The airfoils 60, 62 may include platforms 70 located proximal to the inner diameter 66 thereof. Located below the platforms 70 (e.g., radially inward with respect to the engine axis $A_x$) may be airflow ports and/or bleed orifices that enable air to bleed from the internal cooling passages of the airfoils 60, 62. A root of the airfoil may connect to or be part of the platform 70.

The compressor section 24 is housed within a case 80, which may have multiple parts (e.g., turbine case, diffuser case, etc.). In various locations, components, such as seals, may be positioned between airfoils 60, 62 and the case 80. For example, as shown in FIG. 2, blade outer air seals 82 (hereafter "BOAS") are located radially outward from the blade 60. As will be appreciated by those of skill in the art, the BOAS 82 may include BOAS supports, such as hooks or other mechanisms, that are configured to fixedly connect or attach the BOAS 82 to the case 80 (e.g., the BOAS supports may be located between the BOAS 82 and the case 80). For example, and as shown in FIG. 2, the case 80 includes a plurality of case hooks 84 that engage with BOAS hooks 86 to secure the BOAS 82 between the case 80 and a tip of the airfoil 60.

The compressor section 24 illustrated in FIG. 2 is merely representative of a rotating component configuration. It will be appreciated that the rotating components and sections (e.g., fan section 22, compressor section 24, turbine section 28) may each be configured with rotating blades. The compressor and turbine sections 24, 28 include stator sections arranged in line with the rotating discs of the respective sections 24, 28, and define portions of the core flow path C. Furthermore, although illustrated with airfoils 60 as separate elements mounted to the disks by platform 70, in other configurations the airfoils may be integrally formed with the rotor disks, as integrally bladed rotors, without departing from the scope of the present disclosure.

The rotating parts (bladed or integrally bladed) of the compressors and/or turbines may be subject to a risk of fatigue cracking due to the extreme operating conditions of the engine and in view of the reductions in weight and form factor as engines are improved. The detrimental effects of high-cycle-fatigue are pronounced with thinner and/or more flexible rotor designs. Combined with the severe environmental conditions of high temperature, foreign object damage (FOD), and/or inherent flaws associated with the materials or manufacturing processes, light weight and flexible rotor designs have a relatively high risk for developing and propagating fatigue cracks.

High-cycle fatigue (HCF) on blades can result in cracked or fractured airfoil blades. Although it is undesirable to release an airfoil in service, such an event is not considered to be hazardous. That is, although relatively rare, HCF blade releases are a fact of compressor rotor operations in aircraft engines. However, with technological advancements, rotors are being designed to be thinner and more flexible compared to prior designs, resulting in a greater risk of HCF not only on the blade itself, but on the rotor disc as well. Furthermore, with respect to integrally bladed rotors (IBR), the airfoil-rotor-interaction-zone (ARIZ)—a portion of integrally bladed rotors consisting of the root fillet and a portion of the blade height—is treated as part of the rotor body because HCF can propagate cracks from the airfoil into the rotor body (disc), resulting in an uncontainable hazardous rotor fracture. For example, unforeseen circumstances can lead to rotor cracking such as higher than expected vibratory stresses, service damage, or inherent flaws through forging or manufacturing processes during manufacture of the blades.

In view of the above and other considerations, embodiments of the present disclosure are directed to systems for safeguarding in the unlikely event of a fatigue crack forming either in the disc or the ARIZ of a rotor IBR. Embodiment of the present disclosure may provide a fail-safe functionality by providing crack detection in a blade and/or rotor disc. Embodiments of the present disclosure may cause inspection of a potential crack before an event, or if the crack is not found, a failure mode may result in an in-flight-shutdown (IFSD) rather than an uncontained engine failure. In accordance with embodiments of the present disclosure, a rub mechanism between rotating and stationary components is provided to detect the presence of a crack and thus prevent rotor fracture or other failure events.

In accordance with embodiments of the present disclosure, and as explained and illustrated herein, a rotating component (e.g., rotor disc, IBR) having a primary rub flange is provided. The primary rub flange is positioned relative to a static engine component (e.g., stator, inlet case, bearing housing, etc.). In accordance with some embodiments, the primary rub flange may be placed or arranged at locations for which there is a risk of developing and propagating hazardous cracks. In some configurations, the static component includes an interfacing rub flange in the unlikely event of a crack. In accordance with embodiments of the present disclosure, a primary rub flange is arranged relative to an interfacing rub flange with a predetermined gap or spacing provided to allow for the rotating component to rotate relative to the static component with minimal or no contact therebetween. That is, a predetermined gap or space is defined between rubbing surfaces of the primary rub flange and the interfacing rub flange (i.e., before rubbing between the surfaces occurs).

Figure 3A:
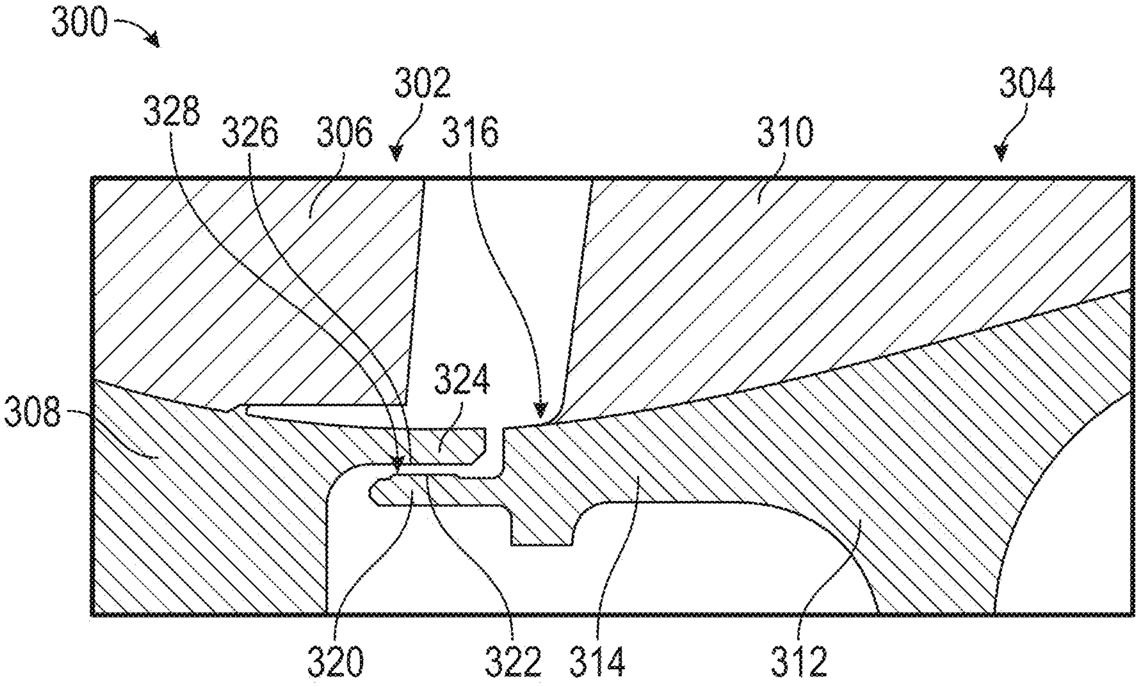
FIG. 3A is a schematic illustration of a portion of an assembly of components of a gas turbine engine in accordance with an embodiment of the present disclosure.
Figure 3B:
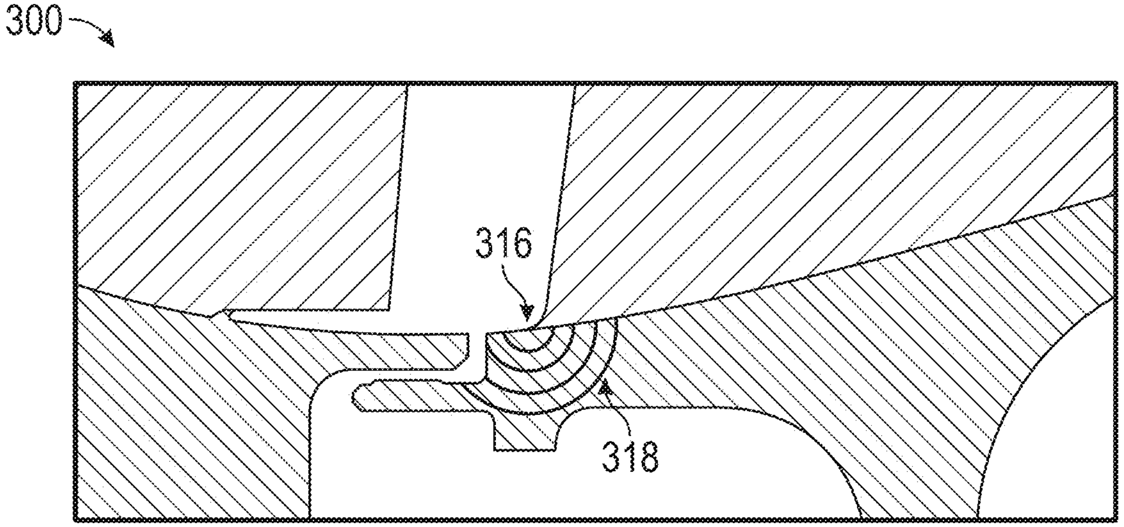
FIG. 3B illustrates a crack propagation in the assembly of FIG. 3A.

Referring now to FIGS. 3A-3B, schematic illustrations of a portion of an engine 300 incorporating an embodiment of the present disclosure are shown. The engine 300 may be similar to that shown and described above. As shown in FIG. 3A, the engine 300 includes a static component 302 and a rotating component 304. The static component 302 may be a vane assembly or other static component of the engine 300. In this illustrative embodiment, the static component 302 includes an airfoil 306 (e.g., vane) and a platform 308. The platform 308 may be an inner diameter platform of a vane assembly, such as shown in FIG. 2 (platform 70 of vane 62). The rotating component 304 includes an airfoil 310 mounted to or integrally formed with a rotor disc 312. The airfoil 310 of the rotor disc 312 may extend from a platform 314, which may be integrally formed with the rotor disc 312 or may be a separate component that is mounted to or otherwise attached to the rotor disc 312.

As shown in FIG. 3A, a portion of the platform 308 of the static component 302 and a portion of the platform 314 of the rotor disc 312 overlap in a space between the static component 302 and the rotating component 304, in an axial direction or a flow direction. During operation, stresses may be experienced by the airfoil 310 (e.g., blade) and/or the material of the platform 314 and/or rotor disc 312. The stresses may result in high cycle fatigue (HCF), which can result in cracking of the material of the rotating component 304 in a stress region 316. Cracks can nucleate to do combined low cycle fatigue/high cycle fatigue loading, with the high steady stress imposing a high mean stress, making the area less tolerant to dynamic stresses. If a crack forms in the stress region 316, the crack may propagate through the material of the rotor disc 312 and/or the platform 314 of the rotating component 304. FIG. 3B illustrates a crack propagation 318 that is formed in or at the stress region 316. The crack propagation 318 may expand through the material of the rotating component 304.

In accordance with the illustrative embodiment of FIGS. 3A-3B, the rotating component 304 includes a primary rub flange 320 that extends outward from the rotating component 304 (e.g., axially forward in the configuration of FIGS. 3A-3B). The primary rub flange 320 includes a primary rubbing surface 322. The static component 302 includes a corresponding interfacing rub flange 324 having a interfacing rubbing surface 326. The primary rubbing surface 322 of the primary rub flange 320 and the interfacing rubbing surface 326 of the interfacing rub flange 324 are axially aligned (relative to an engine axis). Further, in this configuration, the primary rubbing surface 322 of the primary rub flange 320 on the rotating component 304 is arranged radially inward from the interfacing rubbing surface 326 of the interfacing rub flange 324 on the static component 302. That is, the two flanges 320, 324 are substantially aligned with each other to allow for contact of the respective surfaces 322, 326. A separation gap 328 is defined between the surfaces 322, 326 of the flanges 320, 324. The separation gap 328 is predefined and set such that during normal operation the surfaces 322, 326 do not contact, allowing for free and unimpacted rotation of the rotating component relative to the static component.

As noted, in the event that a crack forms in the rotating component 304, the crack will propagate as indicated by the crack propagation 318 shown in FIG. 3B. As the crack propagation 318 grows, the crack will extend into the material of the primary rub flange 320. As the crack propagation 318 enters the primary rub flange 320 the material strength of the primary rub flange 320 will lessen, causing the gap 328 to reduce to the point of contact between the surfaces 322, 326. When the surfaces 322, 326 contact each other, the primary rub flange 320 may cause detectable vibrations and/or instabilities in the engine, which may be detectable by sensors on the engine. The sensors may trigger a notification or alert to be provided in the cockpit and/or to a pilot or other location/personnel regarding a detected variance from nominal operation. In response, the engine may be shut down, an inspection may be performed, maintenance may be performed, or other action may be taken. If the sensors do not detect such a disturbance, the primary rub flange 320 and/or a portion thereof may separate (e.g., break) and enter a core flow path, where FOD may be detected, resulting in remediation action (e.g., shutdown, inspection, etc.).

Figure 4:
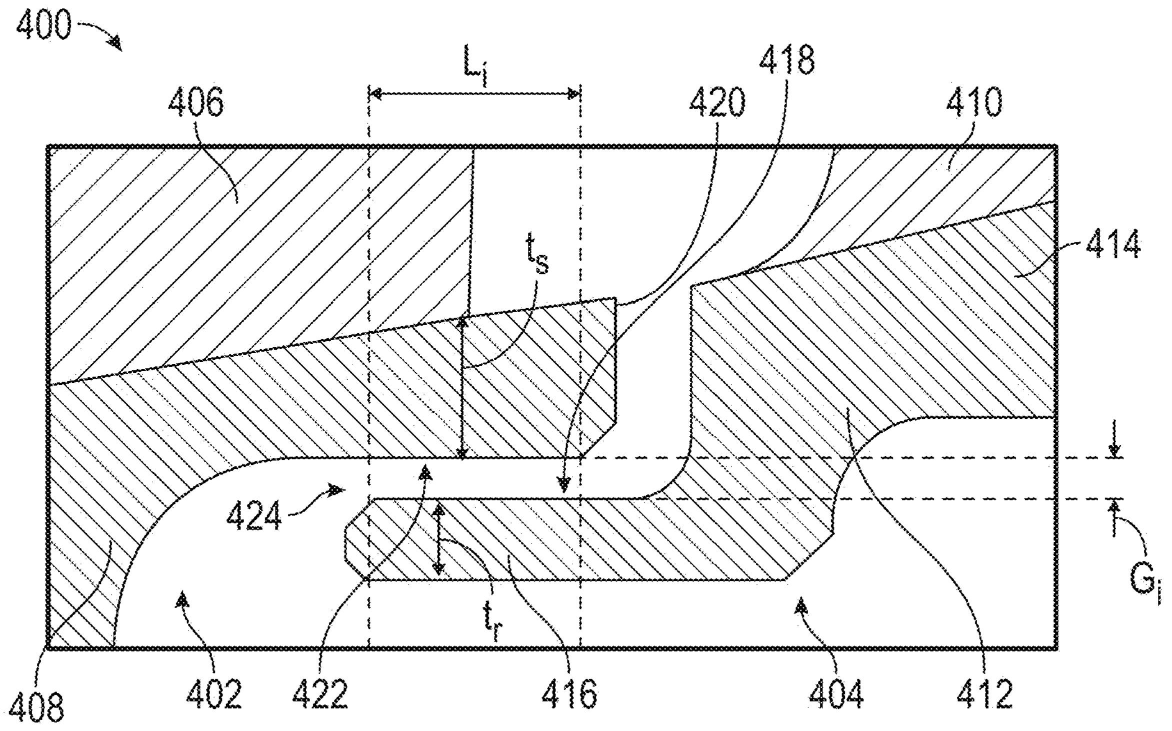
FIG. 4 is a schematic illustration of a portion of an engine having a primary rub flange and interfacing rub flange in accordance with an embodiment of the present disclosure.

Referring now to FIG. 4, a schematic illustration of a portion of an engine 400 in accordance with an embodiment of the present disclosure is shown. The engine 400 may be similar to that shown and described above. The portion of the engine 400 shown in FIG. 4 includes a static component 402 and a rotating component 404. The static component 402 may be a vane assembly or other static component of the engine 400. In this illustrative embodiment, the static component 402 includes an airfoil 406 (e.g., vane) and a platform 408. The platform 408 may be an inner diameter platform of a vane assembly. The rotating component 404 includes an airfoil 410 mounted to a rotor disc 412 or integrally formed with the rotor disc 412 (e.g., IBR). The airfoil 410 of the rotor disc 412 may extend from a platform 414, which may be integrally formed with the rotor disc 412 or may be a separate component that is mounted to or otherwise attached to the rotor disc 412.

The rotating component 404 includes a primary rub flange 416 that extends axially from the platform 414 of the rotor disc 412. The primary rub flange 416 defines a primary rubbing surface 418. The static component 402 includes an interfacing rub flange 420 having a interfacing rubbing surface 422. The interfacing rub flange 420 extends axially from the platform 408 of the static component 402. The primary rubbing surface 418 of the primary rub flange 416 is axially aligned with the interfacing rubbing surface 422 of the interfacing rub flange 420. During normal operation (e.g., no cracks), the primary rubbing surface 418 of the primary rub flange 416 is radially separated from the interfacing rubbing surface 422 of the interfacing rub flange 420 by a separation gap 424.

As shown in FIG. 4, the separation gap 424 has a gap distance $G_i$ at the time of installation. The gap distance $G_i$ may be based on a number of factors and considerations, and is set at a distance sufficient to avoid or prevent contact during use, but also to enable a crack in the rotating component 404 to cause the primary rub flange 416 to move into contact with the interfacing rub flange 420. For example, in some embodiments, the gap distance $G_i$ may be defined as:

$$G_i \geq \Delta CF + \Delta\text{Thermal} + \Delta\text{Gyroscopic} + \Delta\text{Tolerance} \tag{1}$$

In Equation (1), ΔCF the is radial deflection due to centrifugal force; ΔThermal the is radial deflection due to thermal expansion; ΔGyroscopic is the deflection due to gyroscopic loads during aircraft maneuvers; and ΔTolerance is a term to capture considerations for dwg/profile tolerances of the rotating and static components. In addition to defining the separation gap 424 (gap distance $G_i$), a length of overlap $L_i$ of the rubbing surfaces 418, 422 (axial direction), a thickness $t_r$ of the primary rub flange 416 (radial direction), and a thickness $t_s$ of the interfacing rub flange 420 (radial direction), may all be defined and interrelated. The relationship between the thickness $t_r$ of the primary rub flange 416 (radial direction) and the thickness $t_s$ of the interfacing rub flange 420 (radial direction) may apply along the axial length, even with a varying radial thickness. For example, the thickness $t_r$ and the thickness $t_s$ may change in an axial direction along the length of overlap $L_i$, but the relationships described herein are maintained to meet the constraint requirements along the entire length. For example, the length of overlap $L_i$ of the rubbing surfaces 418, 422 may be defined as:

$$L_i \geq t_r + t_s \tag{2}$$

Further, the thicknesses of the rub flanges 416, 420 may be related as:

$$0.5 \leq \frac{t_r}{t_s} \leq 1.5 \tag{3}$$

In accordance with some embodiments, the thickness (radial dimension relative to engine axis) of the two interfacing components or structures (e.g., flanges) as well as the length (axial dimension relative to engine axis) thereof may be sized on a case-by-case basis depending on the critical fatigue crack locations, engine configuration, engine operating conditions, component features and configurations, and the like. The interfacing components are sized, shaped, and arranged to allow of engagement between the two interfacing components in a presence of a crack of a predetermined size in the rotating component. Depending on the mass and speed of the rotor, a rubbing contact force may be required to slow down the rotor and to promote an in-flight shut down. In accordance with embodiments of the present disclosure, the rub mechanism may be self-sustaining, as the rub action will induce heat locally and will narrow or close the gap. In one non-limiting embodiment, the following example values are contemplated to be within the scope of the present disclosure $G_i$=0.25" $L_i$=0.100" $t_r$, =0.050" $t_s$=0.075" and $t_{ur}$=0.040". Of course, values greater and/or lower than the aforementioned values are considered to be within the scope of the present disclosure. It will be appreciated that the gap distance $G_i$ of the separation gap 424 may be sized or set to account for in-service operation, gap closure due to rotor centrifugal force, thermal effects, gyroscopic load, eccentricity, and tolerances The arrangement and features/characteristics of the rub flanges 416, 420 is selected to ensure that contact between the rubbing surfaces 418, 422 will occur prior to a hazardous rotor failure but due to a crack in the rotating component 404. In response to contact between the rubbing surfaces 418, 422, an alert or notification can be generated. Accordingly, remediation and/or other steps may be taken in the event of a crack in the rotating component. For example, if a crack develops on a disc near the primary rub flange, the stiffness of the rotor will reduce locally and the gap local to the crack will reduce as the crack continues to propagate. Eventually, when the crack is a certain size (but still a stable fatigue crack), the primary rub flange on the rotor, or a portion thereof, will rub against the interfacing rub flange of the static component. The rub or contact between the rub surfaces may lead to noticeable engine warnings (e.g., vibration, surge) allowing a pilot or other operator or personnel to perform a commanded shut down. In combination with manual action, in some embodiments, an engine controller or computer may be used to perform actions/operations automatically. In the event there is no noticeable warning, the total rub and burn-through of the rotor will lead to an uncommand in flight shut-down, thus preventing a rotor fracture. The total rub and burn-through refers to interaction between the primary rub flange and the interfacing rub flange. In a non-limiting example, a control logic in a Full Authority Digital Engine Control (FADEC) may receive a signal that if the vibrations are beyond acceptable limits (along with other parameters), the engine will shutdown (stop fuel flow). In some embodiments, even if a pilot or other personnel did not react in a certain timeframe, the engine may be shut-down automatically by the FADEC in response to a detected signal indicative of a rotor crack or the like.

Figure 5:
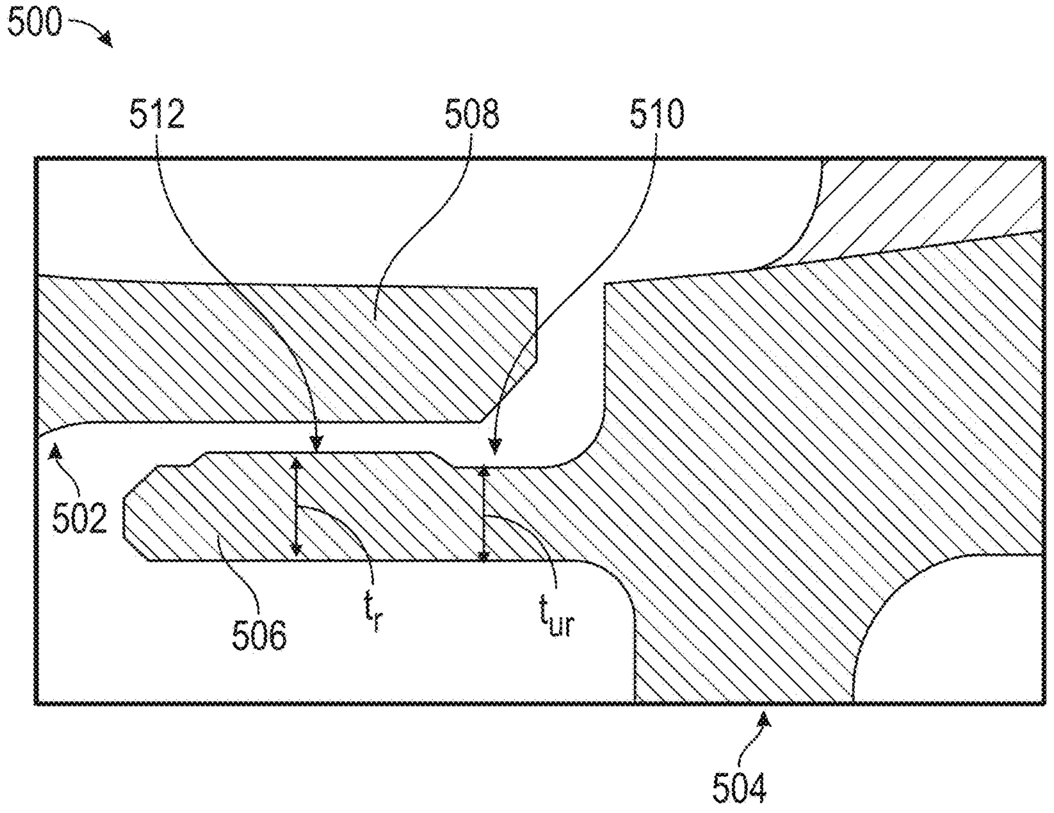
FIG. 5 is a schematic illustration of a portion of an engine having another arrangement of a primary rub flange and interfacing rub flange in accordance with an embodiment of the present disclosure.

Referring to FIG. 5, an alternative configuration of an embodiment of the present disclosure. The arrangement in FIG. 5 is similar to that shown in FIG. 4, and thus like features are not described again. As show in FIG. 5, a static component 502 is arranged relative to a rotating component 504. The rotating component 504 includes a primary rub flange 506 arranged relative to an interfacing rub flange 508 of the static component 502. In this configuration, the primary rub flange 506 includes an undercut 510 that defines a reduced thickness $t_{ur}$ between a primary rubbing surface 512 of the primary rub flange 506 and the body of the rotating component 504 (e.g., platform, disc, etc.). Outward (axially) from the undercut 510 relative to the body of the rotating component 504, the primary rub flange 506 has a thickness $t_r$, which may be defined by Equations (2) and (3). The primary rubbing surface 512 of the primary rub flange 506 may have an axial length defined by Equation (2), above. The reduced thickness $t_{ur}$ portion of the undercut 510 can increase the susceptibility of the primary rubbing surface 512 to contact the interfacing rub flange 508 in the presence of a crack, while also ensuring the thickness $t_r$ of the primary rub flange 506 is sufficient to enable detection of the crack, as described above and herein. The reduced thickness $t_u$ of the undercut 510 may be defined relative to the thickness $t_r$ of the primary rub flange 506 as:

$$0.5 \le \frac{t_{ur}}{t_r} \le 0.9 \qquad (4)$$

In one non-limiting embodiment, the axial length of the undercut is less than the engagement length or the length of overlap $L_i$. Of course, values greater and/or lower than the aforementioned values are considered to be within the scope of the present disclosure.

Figure 6:
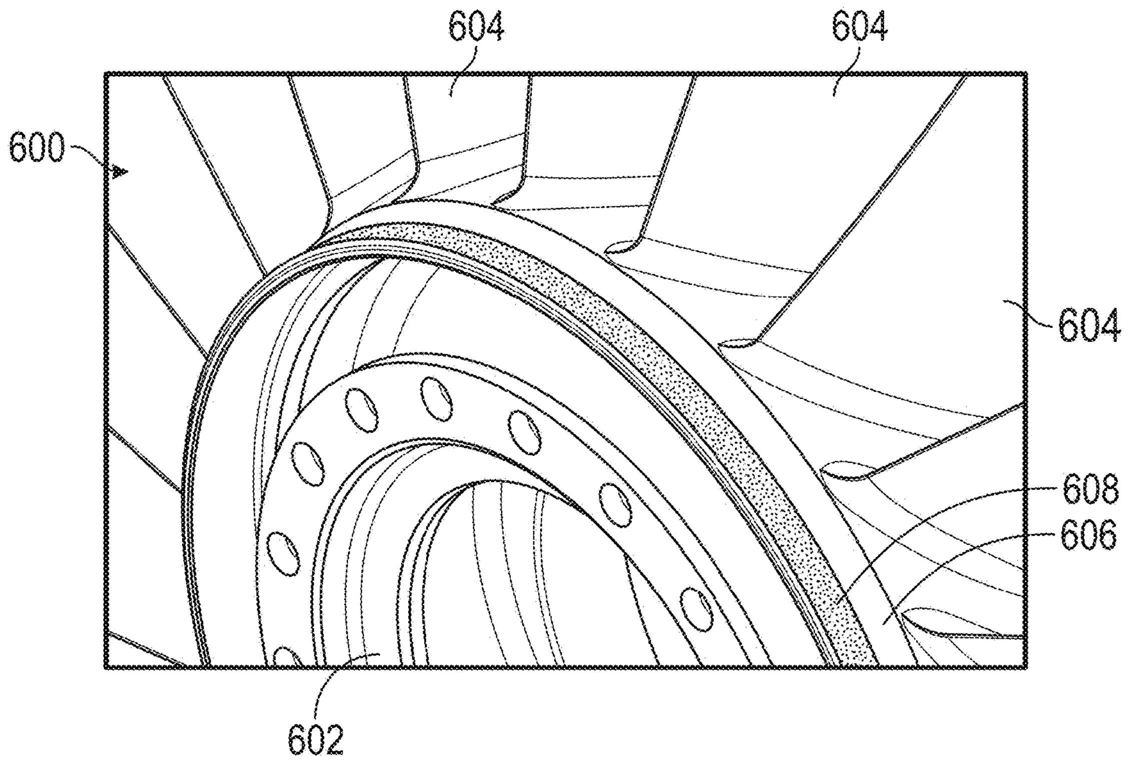
FIG. 6 is a schematic illustration of a portion of an engine having another arrangement of a primary rub flange in accordance with an embodiment of the present disclosure.

Referring now to FIG. 6, a schematic illustration of a rotating component 600 in accordance with an embodiment of the present disclosure is shown. The rotating component 600, in this illustrative configuration, is an integrally-bladed rotor. The rotating component 600 includes a rotor disc 602 and a plurality of blades 604 extending radially from the rotor disc 602. The rotor disc 602 includes a primary rub flange 606 that extends axially from the rotor disc 602. The primary rub flange 606 includes a primary rubbing surface 608. In this illustrative configuration, the primary rub flange 606 and the primary rubbing surface 608 are a full hoop, circumferential, or continuous element. That is, the primary rub flange 606 and the primary rubbing surface 608 extend about the full circumferential extent of the rotor disc 602. Accordingly, forward of each blade 604 is a portion of the primary rub flange 606. If a crack forms at the base of any of the blades 604, the crack may propagate into the material of the primary rub flange 606. When a crack propagates into the primary rub flange 606, the primary rub flange 606 may become structurally weakened and thus deflect a greater amount than uncracked portions of the rotating component 600 during rotation. The deflection of the primary rub flange 606 during rotation of the rotating component 600 may cause contact between the primary rubbing surface 608 and a corresponding rubbing surface of a static component (not shown), as shown and described above. The contact between the primary rubbing surface 608 and the static component may generate detectable, unique, or unusual vibration signature(s), an engine surge, and/or unusual start-up and/or run-down noise(s).

Figure 7:
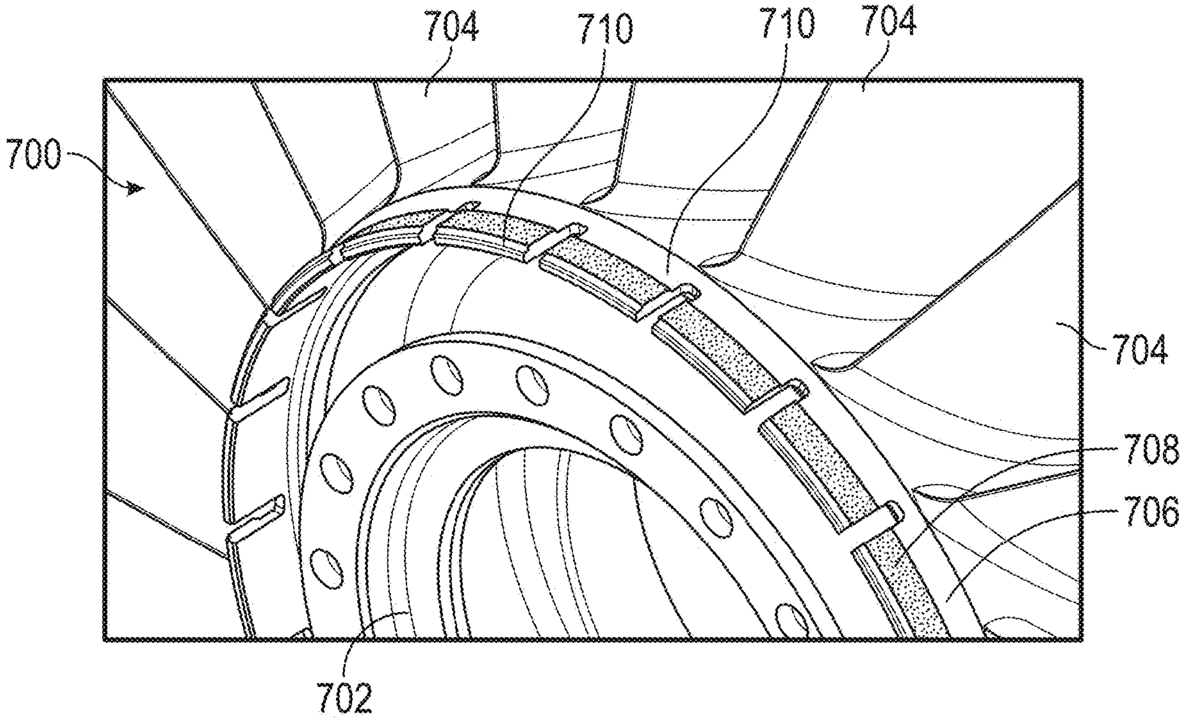
FIG. 7 is a schematic illustration of a portion of an engine having another arrangement of a primary rub flange in accordance with an embodiment of the present disclosure.

Referring now to FIG. 7, a schematic illustration of a rotating component 700 in accordance with an embodiment of the present disclosure is shown. The rotating component 700, in this illustrative configuration, is an integrally-bladed rotor. The rotating component 700 includes a rotor disc 702 and a plurality of blades 704 extending radially from the rotor disc 702. The rotor disc 702 includes a primary rub flange 706 that extends axially from the rotor disc 702. The primary rub flange 706 includes a primary rubbing surface 708. In this illustrative configuration, the primary rub flange 706 and the primary rubbing surface 708 are discontinuous in the circumferential direction. Stated another way, the primary rub flange 706 is configured as a set of fingers or tabs 710. In this illustrative configuration, there is one tab 710 arranged relative to each blade 704. By implementing the primary rub flange 706 as a plurality of tabs 710, the deflection of the individual tabs 710 may be more pronounced and thus easier (or earlier in crack propagation) to detect, and thus this configuration may provide a mechanism for crack detection compared to the configuration of FIG. 6. However, due to the reduced structural properties, the tabbed configuration (FIG. 7) may not be possible in all locations in an engine, and thus the specific configuration of the primary rub flange may be depending upon various factors including operational considerations, components and materials, or the like.

Figure 8:
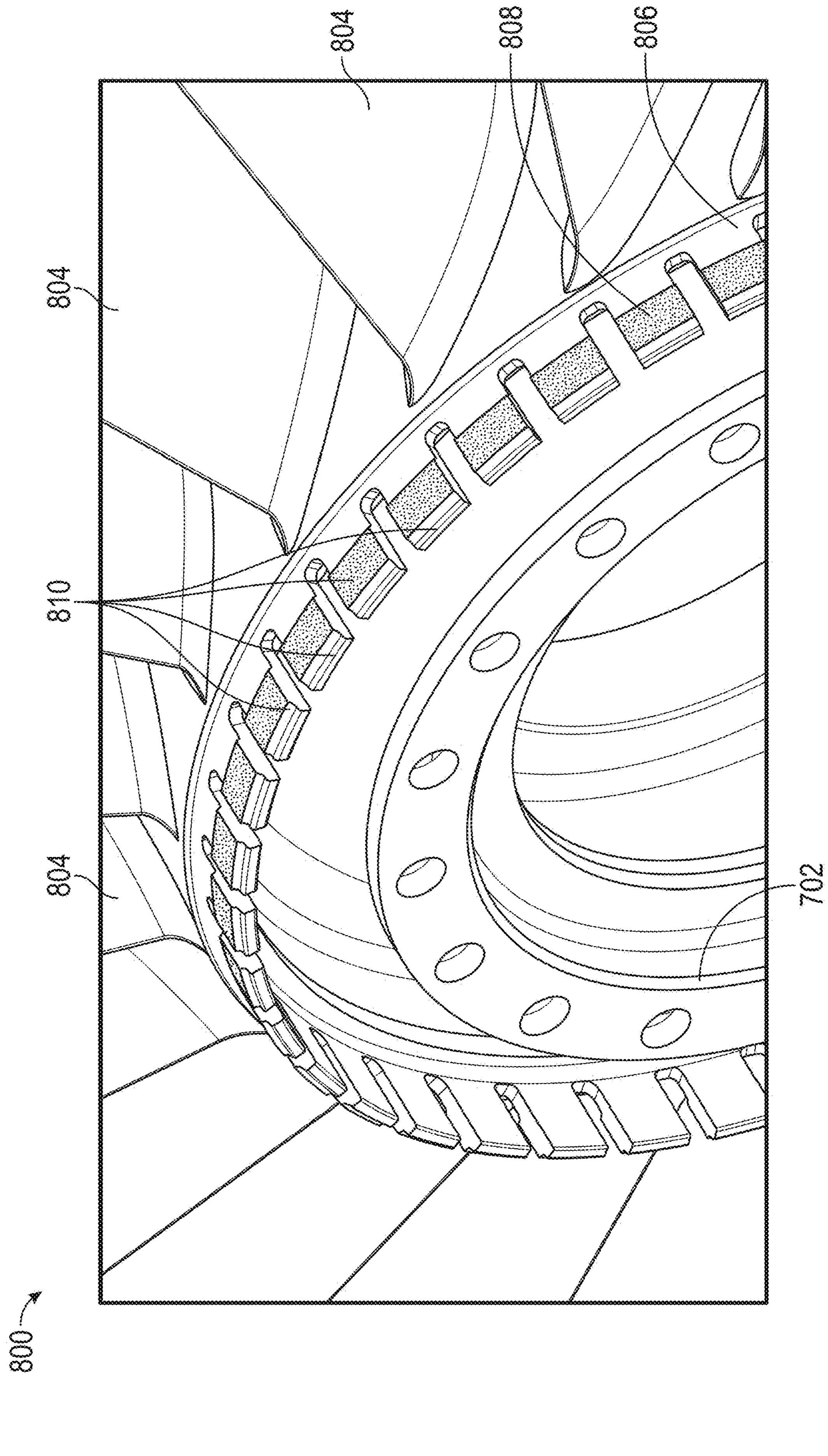
FIG. 8 is a schematic illustration of a portion of an engine having another arrangement of a primary rub flange in accordance with an embodiment of the present disclosure.

Referring now to FIG. 8, a schematic illustration of a rotating component 800 in accordance with an embodiment of the present disclosure is shown. The rotating component 800, in this illustrative configuration, is an integrally-bladed rotor. The rotating component 800 includes a rotor disc 802 and a plurality of blades 804 extending radially from the rotor disc 802. The rotor disc 802 includes a primary rub flange 806 that extends axially from the rotor disc 802. The primary rub flange 806 includes a primary rubbing surface 808. In this illustrative configuration, the primary rub flange 806 and the primary rubbing surface 808 are discontinuous in the circumferential direction, similar to that of FIG. 7, with the primary rub flange 806 being configured as a set of fingers or tabs 810. In this illustrative configuration, there are two tabs 810 arranged relative to each blade 804. Similar to the configuration of FIG. 7, the implementation of the tabs 810 may allow for earlier detection of cracks that form in the rotor disc 802.

In view of the above, it will be appreciated that any number of tabs may be provided to align with one or more blades of the rotor disc. In embodiments that incorporate a tab-like configuration for the primary rub flange, each tab element includes a respective primary rubbing surface. In some such embodiments, the spacing between adjacent tabs may be based on, for example and without limitation, component dynamics and acoustics to ensure that no natural frequencies or harmonic tones are induced and/or based on local steady and dynamic stress fields. The slots between tabs may be minimized in terms of depth, width, etc., to allow for maximum coverage of the material of the rotating component. In addition to having circumferential separation or circumferential gaps within the primary rub flange, axial spacing may be provided in the primary rubbing surface of the primary rub flange.

Figure 9A:
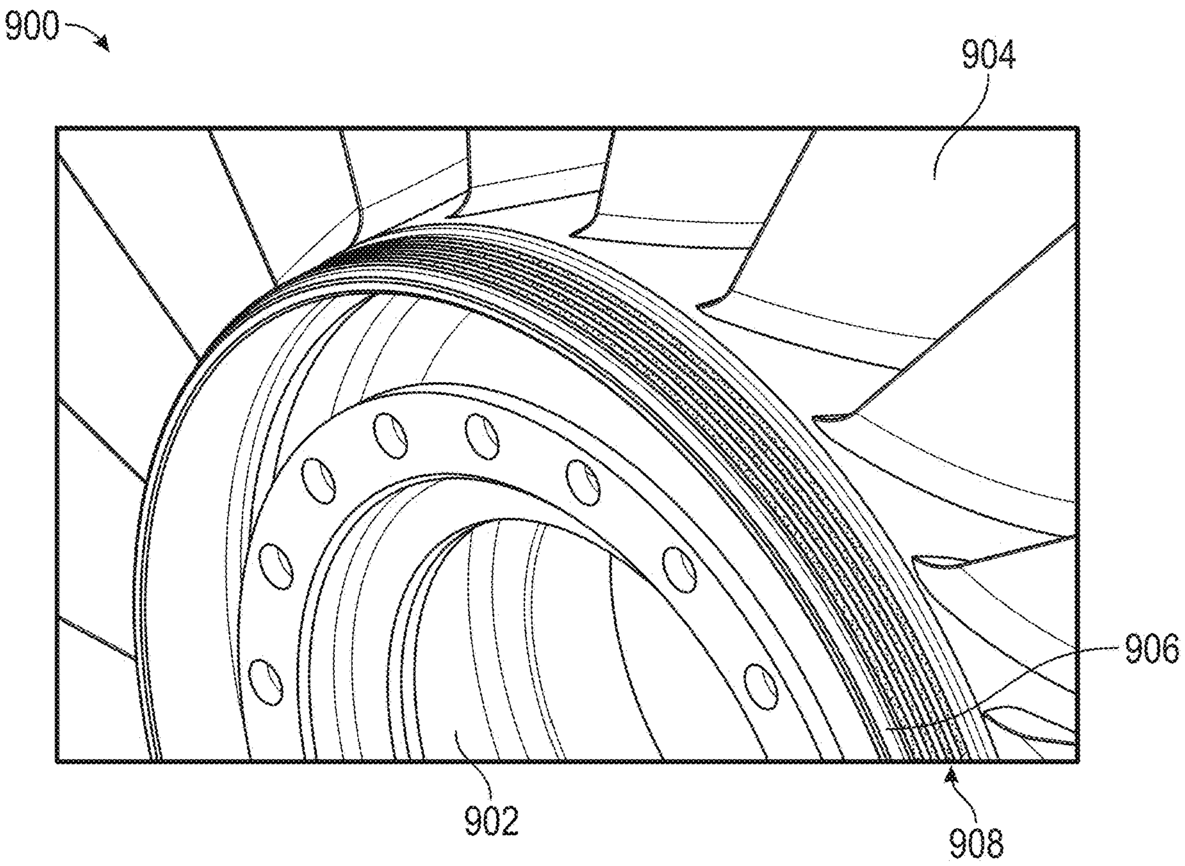
FIG. 9A is a schematic illustration of a portion of an engine having another arrangement of a primary rub flange in accordance with an embodiment of the present disclosure.
Figure 9B:
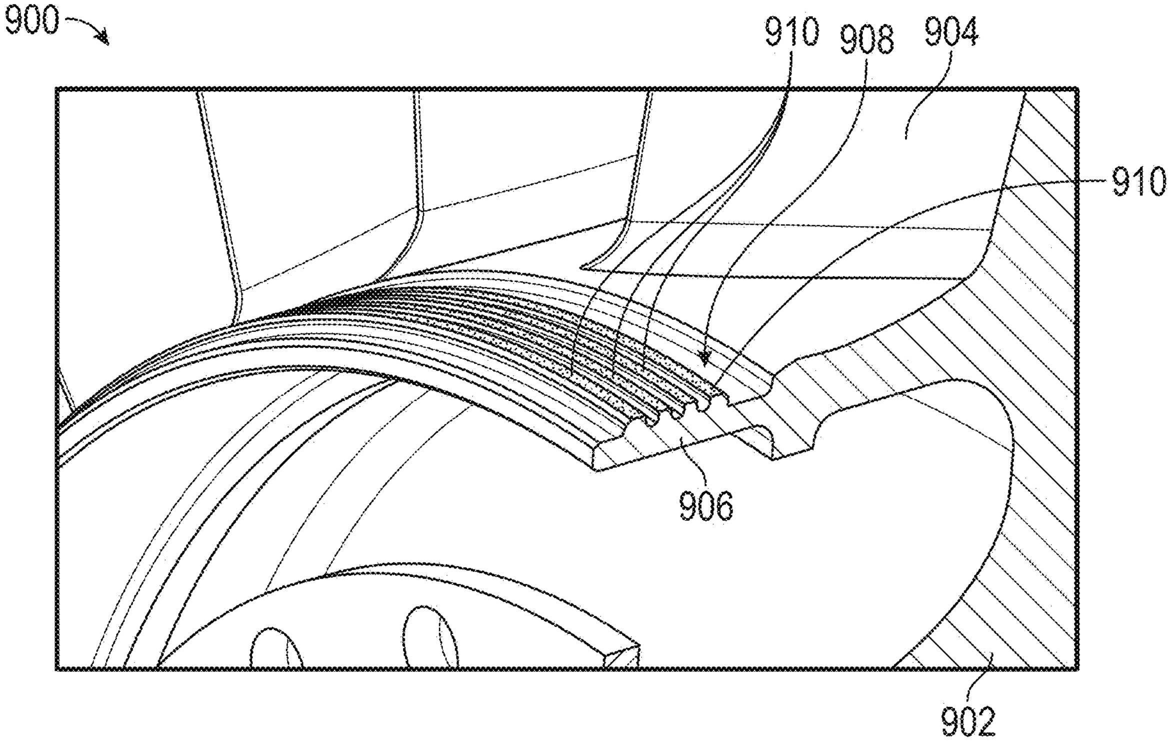
FIG. 9B is a partial cross-sectional view of the assembly of FIG. 9A.

For example, with reference to FIGS. 9A-9B, schematic illustrations of a rotating component 900 in accordance with an embodiment of the present disclosure are shown. The rotating component 900, in this illustrative configuration, is an integrally-bladed rotor. The rotating component 900 includes a rotor disc 902 and a plurality of blades 904 extending radially from the rotor disc 902. The rotor disc 902 includes a primary rub flange 906 that extends axially from the rotor disc 902. The primary rub flange 906 includes a primary rubbing surface 908. In this illustrative configuration, the primary rubbing surface 908 is a discontinuous surface in the axial direction. In this illustrative configuration, the primary rubbing surface 908 is formed of discrete rubbing elements 910. The rubbing elements 910 of this configuration are full hoop or circumferential elements arranged on a continuous or full hoop primary rub flange 906.

Although the configurations illustrated in the above described embodiments are each unique, those of skill in the art will appreciate that features of the various embodiments may be combined to form configurations not explicitly illustrated or discussed, and do not depart from the scope of the present disclosure. For example, the rubbing element configuration of FIGS. 9A-9B may be implemented on a tabbed configuration (e.g., FIG. 7 or 8). Further, the rubbing element configuration of FIGS. 9A-9B and/or the tabbed configurations of FIGS. 7-8 may include an undercut, such as shown and described with respect to FIG. 5.

In accordance with some embodiments, by having multiple rubbing elements in the form of tabs (FIGS. 7-8) or in discrete rubbing elements (FIGS. 9A-9B), there may be a tendency for a local deformation to occur more pronounced on an individual element. For example, such tabs would not be constrained by a full hoop structure, and thus may bend more freely, allowing for improved detection of cracks or the like. Furthermore, a greater number of tabs may allow for easier local reaction to a material anomaly which may be very small and very local on the part.

In accordance with embodiments of the present disclosure, the primary rub flange may be formed from the same material as the rotor disc from which it extends. That is, the primary rub flange may be integrally formed with the rotating component. The primary rubbing surfaces of the primary rub flange and the interfacing rub flange may be formed from different materials. The selection of material may be made to prevent fires from igniting due to material rubbing/contact. Accordingly, in one non-limiting embodiment, the rotating component (and the primary rub flange) may be formed from titanium or other metal, while the static component (and the interfacing rub flange) may be formed from a different metal material. In accordance with embodiments of the present disclosure, no wear pad or sacrificial surface or coating is provided at the interface between the primary rub flange and the interfacing rub flange. Rather, the contact between the primary rub flange and the interfacing rub flange is a metal-on-metal contact. In accordance with embodiments of the present disclosure, it is not the detection of a separation of a part or portion of the primary rub flange, but rather detection of a vibration, noise, engine surge, or the like that is caused by the rubbing and contact between the primary rub flange and the interfacing rub flange. It will be appreciated that separation of a tab or portion of the primary rub flange may result in a secondary detection mechanism. However, embodiments of the present disclosure are directed to providing a mechanism for detection of cracks within a rotating component prior to damage or failure.

Figure 10:
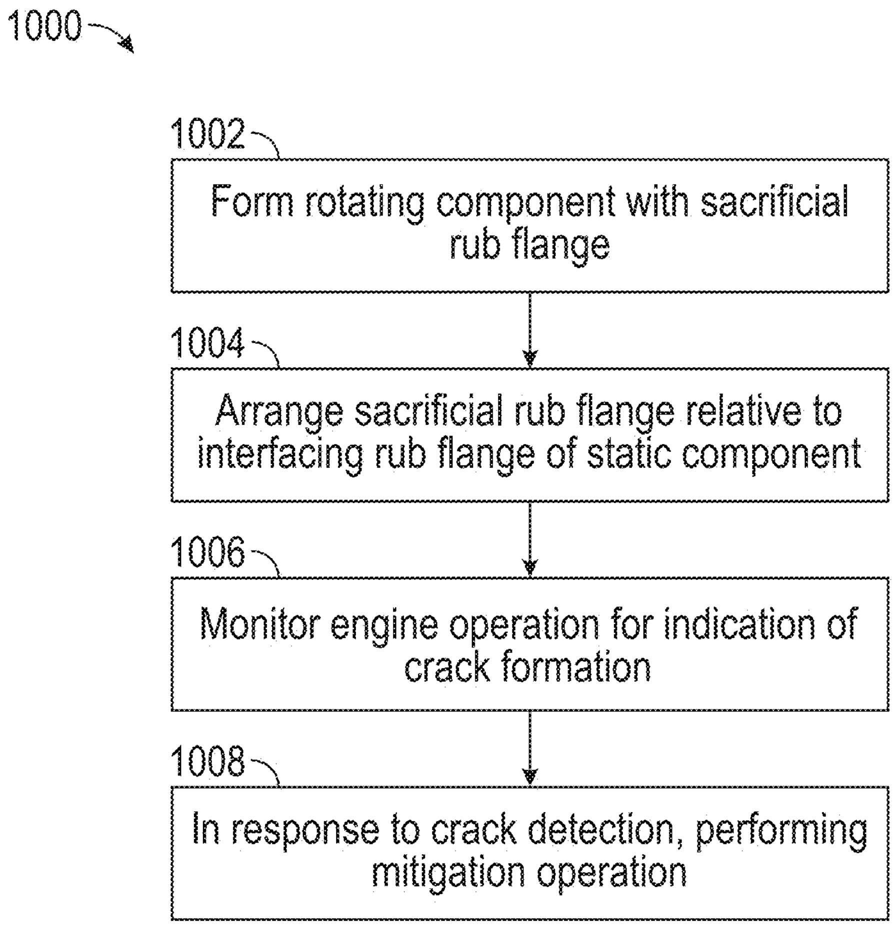
FIG. 10 is a flow process for monitoring operation of an engine and detecting crack formation in rotating components in accordance with an embodiment of the present disclosure.

Referring now to FIG. 10, a process for monitoring operation of an engine 1000 in accordance with an embodiment of the present disclosure is shown. The process 1000 may be performed with an engine having a rotating component having a primary rub flange as shown and described above.

At step 1002, a rotating component, such as a rotor disc, is formed with a primary rub flange. The primary rub flange may be formed with the rotating component, such as during casting, machining, fabrication, or during manufacture thereof. The primary rub flange is formed of the same material of the rotating component such that a crack that forms within the rotating component can propagate into and through the material of the primary rub flange. The primary rub flange may be formed in accordance with Equations (1)-(4). As such, the primary rub flange may be formed with an undercut (e.g., FIG. 5), and/or tabs (e.g., FIGS. 7-8), and/or rubbing elements (e.g., FIGS. 9A-9B).

At step 1004, the rotating component is installed and arranged relative to a static component of an engine. More specifically, at step 1004, the primary rub flange of the rotating component is arranged relative to an interfacing rub flange of the static component. As discussed above, the properties of the primary rub flange may be based, in part, on the radial thickness of the interfacing rub flange of the static component (e.g., Equations (2), (3)). When positioning the primary rub flange relative to the interfacing rub flange, a separation gap is preset between the rubbing surfaces of the respective rub flanges (e.g., Equation (1)). The separation gap is set such that during operation of the rotating component under normal operational conditions no contact between the rubbing surfaces will occur. However, if a crack forms in the rotating component, the primary rub flange may displace or bend due to the mechanical weakness induced by the crack and contact the interfacing rub flange.

At step 1006, operation of the engine is monitored using one or more sensors or other detection means for evidence of crack formation in the rotating component. For example, and without limitation, the monitoring may be for vibrations induced by rubbing between the primary rub flange and the interfacing rub flange (e.g., vibration signatures), noise produced by the rubbing (e.g., at engine start-up, shut-down, run-down, cruise, etc.), engine surge, or the like. For each detection type, a threshold or trigger event may be set to ensure an alert or notification is generated. For example, in the case of vibration monitoring, if a vibration signature is detected that is outside of nominal operation, it may be indicative of rubbing between the primary rub flange and the interfacing rub flange. Accordingly, a vibration signal of the engine operation may be monitored. In the case of noise production, the detection may be made by personnel (e.g., on the ground) or through acoustic sensors or the like that are arranged on or near the engine. In the case of engine surge, a sensor(s), control logic, FADEC, or the like may include surge detection logic that monitors for unbalance due to induced rubbing of the flange elements and/or burn-through. It will be appreciated that other monitoring and/or detection mechanisms may be employed without departing from the scope of the present disclosure. The monitoring may also include detection of foreign object damage (FOD) that is caused by release of a tab or portion of the primary rub flange and/or the interfacing rub flange.

At step 1008, a mitigation operation may be performed in response to detection of a crack formation at step 1006. For example, a pilot may shut down an engine that is operating with detectable characteristics indicative of a crack in a rotating component. In some configurations, the mitigation response may be automated by an engine controller (e.g., FADEC, etc.), which may automatically shut down an engine if a crack is detected. If an aircraft is not in flight or when the aircraft lands, or based on other criteria, the mitigation operation may include inspection, repair, replacement, or the like. Such inspections may require removal of the engine for teardown and component replacement, which may be achieved before the crack in the rotor can propagate to a critical length. Accordingly, adverse events and/or engine failure may be avoided.

Advantageously, embodiments of the present disclosure provide for improved rotor crack detection. In accordance with embodiments of the present disclosure, mechanisms to safeguard in the unlikely event of a fatigue crack forming either in a rotor disc or the ARIZ of a rotor IBR are provided. Embodiments of the present disclosure provide a fail-safe because a crack can lead to an eventual discovery either before an event, or if the crack is not found, the failure mode would result in an in-flight-shutdown (IFSD) rather than an uncontained engine failure. As shown and described above, a rub mechanism aided by the presence of a crack is provided to prevent the rotor fracture by identifying the presence of a crack in the rotor prior to failure.

Advantageously, embodiments of the present disclosure are arranged to cause a rub event between a primary rub flange (rotating component) and an interfacing rub flange (static component). The rub event is induced by a crack on the rotating component that causes the primary rub flange to deflect (e.g., reduced stiffness, increased deflection) and rub against the interfacing rub flange. The rub event can cause an engine characteristic to be detected that will lead to intervention. For example, and without limitation, the engine characteristics may include one or all of a unique or unusual vibration signature, an engine surge, and/or an unusual start-up and/or run-down noise. In response to detection of the engine characteristic, an intervention may be initiated that may lead to engine shutdown and a subsequent inspection. The inspection can lead to the removal of the engine for teardown and component replacement before the crack in the rotor can propagate to a critical length. Accordingly, adverse events and/or engine failure may be avoided by implementation of embodiments of the present disclosure.

As used herein, the term “about” and “substantially” are intended to include the degree of error associated with measurement of the particular quantity based upon the equipment available at the time of filing the application. For example, these terms may include a range of ±8%, or 5%, or 2% of a given value or other percentage change as will be appreciated by those of skill in the art for the particular measurement and/or dimensions referred to herein. Further, the terms “about” and “substantially”, when associated with non-numerical limits, are intended to include degrees of errors and/or minor variations as would be apparent to those of skill in the art when considering such concepts (e.g., shapes, relative arrangements, etc.).

The terminology used herein is for the purpose of describing particular embodiments only and is not intended to be limiting of the present disclosure. As used herein, the singular forms “a,” “an,” and “the” are intended to include the plural forms as well, unless the context clearly indicates otherwise. It will be further understood that the terms “comprises” and/or “comprising,” when used in this specification, specify the presence of stated features, integers, steps, operations, elements, and/or components, but do not preclude the presence or addition of one or more other features, integers, steps, operations, element components, and/or groups thereof. It should be appreciated that relative positional terms such as “forward,” “aft,” “upper,” “lower,” “above,” “below,” “radial,” “axial,” “circumferential,” and the like are with reference to normal operational attitude and should not be considered otherwise limiting.

While the present disclosure has been described with reference to an illustrative embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. A gas turbine engine comprising:

a rotating component comprising a disc and defining an axis therethrough; and a static component arranged axially adjacent to the rotating component, wherein the rotating component comprises a primary rub flange that extends axially from the disc of the rotating component toward the static component, wherein the static component comprises an interfacing rub flange extending axially from the static component toward the rotating component, the interfacing rub flange arranged radially adjacent to the primary rub flange, wherein the primary rub flange comprises a primary rubbing surface and the interfacing rub flange comprises an interfacing rubbing surface, and the primary rubbing surface is spaced from the interfacing rubbing surface by a separation gap, and wherein the primary rub flange is configured to deflect in the presence of a crack in the disc to close the separation gap such that the primary rubbing surface contacts the interfacing rubbing surface.

2. The gas turbine engine of claim 1, wherein the primary rub flange is formed of a same material as the disc.

3. The gas turbine engine of claim 1, wherein each of the primary rub flange and the interfacing rub flange are made of metal.

4. The gas turbine engine of claim 3, wherein the primary rub flange is formed of a first metal and the interfacing rub flange is formed of a second metal that is different from the first metal.

5. The gas turbine engine of claim 1, wherein the primary rub flange has a thickness $t_r$ in a radial direction and the interfacing rub flange has a thickness $t_s$ in a radial direction, and wherein:

$$0.5 \leq \frac{t_r}{t_s} \leq 1.5.$$

6. The gas turbine engine of claim 1, wherein the primary rub flange has a thickness $t_r$ in a radial direction, the interfacing rub flange has a thickness $t_s$ in a radial direction, and the primary rubbing surface and the interfacing rubbing surface define an axial length of overlap $L_i$, and wherein $L_i \geq t_r + t_s$.

7. The gas turbine engine of claim 1, wherein the separation gap has a gap distance $G_i$, without the presence of a crack, and the gap distance $G_i$ is defined as: $G_i \geq \Delta CF + \Delta Thermal + \Delta Gyroscopic + \Delta Tolerance$.

8. The gas turbine engine of claim 1, wherein the primary rub flange includes an undercut between the disc and the primary rubbing surface.

9. The gas turbine engine of claim 8, wherein the undercut defines a portion of the primary rub flange having a smaller radial thickness than a portion of the primary rub flange that defines the primary rubbing surface.

10. The gas turbine engine of claim 9, wherein the undercut has a radial thickness $t_{ur}$ and the portion of the primary rub flange that defines the primary rubbing surface has a radial thickness $t_r$, and wherein $$0.5 \leq \frac{t_{ur}}{t_r} \leq 0.9.$$

11. The gas turbine engine of claim 1, wherein the rotating component is an integrally bladed rotor disc comprising a plurality of rotor blades that are integrally formed with the disc.

12. The gas turbine engine of claim 1, wherein the primary rub flange defines a continuous, annular extension from the rotating component.

13. The gas turbine engine of claim 1, wherein the primary rub flange defines a discontinuous set of tabs arranged circumferentially about and extending from the rotating component.

14. The gas turbine engine of claim 13, wherein the disc comprises a plurality of blades extending radially outward from the disc, and the primary rub flange comprises one tab of the set of tabs for each blade of the plurality of blades.

15. The gas turbine engine of claim 13, wherein the disc comprises a plurality of blades extending radially outward from the disc, and the primary rub flange comprises two tabs of the set of tabs for each blade of the plurality of blades.

16. The gas turbine engine of claim 1, wherein the primary rub flange comprises a set or discrete rubbing elements extending about the circumference of the primary rub flange.

17. The gas turbine engine of claim 1, further comprising a controller configured to monitor operation of the gas turbine engine for indication of crack formation, wherein the indication of crack formation is at least one of vibration signatures, engine surge signatures, and/or noise signatures that are indicative of a crack due to rubbing between the primary rub flange and the interfacing rub flange.

* * * * *